(12) United States Patent
Wang

(10) Patent No.: US 11,242,002 B2
(45) Date of Patent: Feb. 8, 2022

(54) EJECTION TYPE SAFETY WARNING SIGN FOR CAR AND EJECTION SYSTEM THEREOF

(71) Applicant: ZHENG ZHOU DELTA MOTOR SERVICES CO., LTD., Zhengzhou (CN)

(72) Inventor: Yinan Wang, Zhengzhou (CN)

(73) Assignee: ZHENG ZHOU DELTA MOTOR SERVICES CO., LTD., Zhengzhou (CN)

( * ) Notice: Subject to any disclaimer, the term of this patent is extended or adjusted under 35 U.S.C. 154(b) by 543 days.

(21) Appl. No.: 16/312,291

(22) PCT Filed: Jan. 24, 2018

(86) PCT No.: PCT/CN2018/074037
§ 371 (c)(1),
(2) Date: Dec. 21, 2018

(87) PCT Pub. No.: WO2018/161730
PCT Pub. Date: Sep. 13, 2018

(65) Prior Publication Data
US 2019/0202351 A1   Jul. 4, 2019

(30) Foreign Application Priority Data
Mar. 10, 2017   (CN) .......................... 201710143041.X

(51) Int. Cl.
B60Q 7/00   (2006.01)
E01F 9/654  (2016.01)
G09F 13/16  (2006.01)

(52) U.S. Cl.
CPC .............. *B60Q 7/005* (2013.01); *E01F 9/654* (2016.02); *G09F 13/16* (2013.01)

(58) Field of Classification Search
CPC ........... B60Q 7/005; E01F 9/654; G09F 13/16
(Continued)

(56) References Cited

U.S. PATENT DOCUMENTS 4,952,910 A * 8/1990 Straten ..................... B60Q 7/00
                                                        340/473
5,363,792 A * 11/1994 Petechik .................. B60Q 1/50
                                                        116/28 R
(Continued)

*Primary Examiner* — Kerri L McNally
(74) *Attorney, Agent, or Firm* — Platinum Intellectual Property LLP

(57) ABSTRACT

The invention discloses an ejection type safety warning sign for car, having a polyhedral structure for suppressing tumbling in a free state, capable of being restrained into tubular storage state by external force, and automatically releasing as polyhedral structure when external force disappears; polyhedral structure having warning marker on surface. A ejection system comprises: warning sign; launch tube having inner cavity for accommodating warning sign in tubular storage state; pressure tank communicated with end of launch tube; solenoid valve disposed between launch tube and pressure tank; controller connected to solenoid valve; launch tube having piston for pushing warning sign. When sudden situation occurs during driving, driver can press ejection button of warning sign while braking, so that warning sign can be ejected and stays near position of braking. Location of warning sign is at distance from position parking, eliminating take warning sign, promptly alerting rear car, reducing rear-end accidents.

9 Claims, 2 Drawing Sheets

(58) Field of Classification Search
USPC .......................................................... 116/56
See application file for complete search history.

(56) References Cited

U.S. PATENT DOCUMENTS

| | | | | |
|---|---|---|---|---|
| 7,941,952 | B1* | 5/2011 | Corbean | G09F 15/005 |
| | | | | 40/610 |
| 2004/0107619 | A1* | 6/2004 | Perelli | G09F 19/22 |
| | | | | 40/610 |
| 2005/0237173 | A1* | 10/2005 | Huang | B60Q 7/00 |
| | | | | 340/473 |
| 2006/0103543 | A1* | 5/2006 | Chen | B60Q 7/00 |
| | | | | 340/815.45 |
| 2008/0218329 | A1* | 9/2008 | Fan | B60Q 7/00 |
| | | | | 340/473 |
| 2009/0308304 | A1* | 12/2009 | Ho | G09F 13/16 |
| | | | | 116/63 T |

* cited by examiner

EJECTION TYPE SAFETY WARNING SIGN FOR CAR AND EJECTION SYSTEM THEREOF

TECHNICAL FIELD

The present invention relates to the fields of car safety, in particular to an ejection type safety warning sign for car and an ejection system thereof.

BACKGROUND

In recent years, with the increase of car ownership, the increase of haze phenomenon and the overload of large trucks, the number of consecutive rear-end collision on expressways has been increasing. The number of consecutive rear-end cars ranges from a dozen to dozens, which cause the consequences of great injuries and deaths at the same time.

A large part of these accidents are caused by the fact that drivers do not have time to place safety warning signs. Through calculation, the average time is no less than three minutes from the driver seeing the emergency situation in front of the driver, taking the braking measures, waiting until the car stops, walking out of the car to the trunk to take the safety warning sign, walking to the safe distance behind the car, to placing the safety warning sign. If the trunk has too much baggage and it is inconvenient to take the safety warning sign, it will last longer. There are even some drivers who are unwilling to get off the bus to place the safety warning sign because of poor safety awareness or bad weather outside the car. The safety warning signs of existing car are required to be picked up manually by the driver and placed at a safe distance to the rear of the car on foot. The disadvantage is that it takes a long time to be placed, and it is impossible to promptly and effectively warn the rear car, thereby increasing the probability of a rear-end collision. The technical solution of the present invention can realize the rapid placement of the safety warning sign, and can effectively alert rear vehicles in time to avoid it in the first time.

DESCRIPTION

In view of the deficiencies in the prior art, the present invention provides an ejection type safety warning sign for car, which can quickly place the safety warning sign on the road surface, and ejection system thereof.

In order to achieve the purpose mentioned above and other advantages, the technical solution of the present invention is as follows:

an ejection type safety warning sign for car, having a polyhedral structure for suppressing tumbling in a free state, and capable of being restrained into a tubular storage state by an external force, and automatically releasing as the polyhedral structure when the external force disappears; the polyhedral structure having a warning marker on the surface.

Preferably, in the warning sign, the polyhedral structure is a tetrahedron.

Preferably, in the warning sign, the polyhedral structure includes at least:

a circular tube having a stop ring;

a slip ring slidably movable to the circular tube;

an elastic member elastically connecting the stop ring and the slip ring;

a brace strut connected to the slip ring;

a rigid rope, one end of which is connected to one end of the circular tube near the stop ring, and the other end is connected to the brace strut;

a flexible rope that connects the rigid rope;

wherein the rigid rope and the flexible rope are also connected with a flexible cloth having a warning marker.

Preferably, in the warning sign, the rigid rope is a wire rope.

Preferably, in the warning sign, the flexible rope is a nylon rope.

A ejection system, comprising:

the warning sign as described in any of the preceding paragraph;

a launch tube having an inner cavity for accommodating the warning sign in the tubular storage state;

a pressure tank communicated with an end of the launch tube;

a solenoid valve disposed between the launch tube and the pressure tank;

a controller electrically connected to the solenoid valve;

wherein the launch tube is provided with a piston for pushing the warning sign.

Preferably, in the ejection system, wherein the ejection system further comprises a pressure sensor disposed in the pressure tank and electrically connected to the controller.

Preferably, in the ejection system, wherein the pressure tank has an air inlet.

Preferably, in the ejection system, wherein the controller is also electrically connected with a vehicle speed sensor.

Preferably, in the ejection system, wherein the controller is also electrically connected with a trigger switch.

The beneficial advantages of the present invention are: when a sudden situation occurs during driving of the motor vehicle, the driver can press an ejection button of the safety warning sign while braking, so that the safety warning sign ejects and stays near the position where the braking is started. The location of the safety warning sign is at a distance from the position where the motor vehicle is parked, which eliminates the need for the driver to take the warning sign and then walk through this distance.

DETAILED DESCRIPTION

Figure 1:
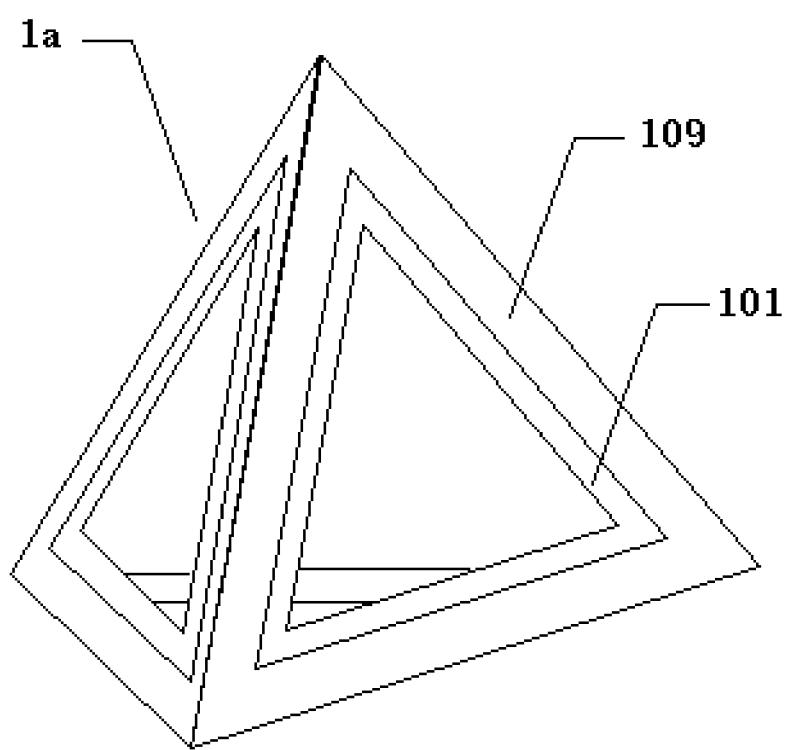
FIG. 1 is a structural view of the warning sign of embodiment 1.
Figure 2:
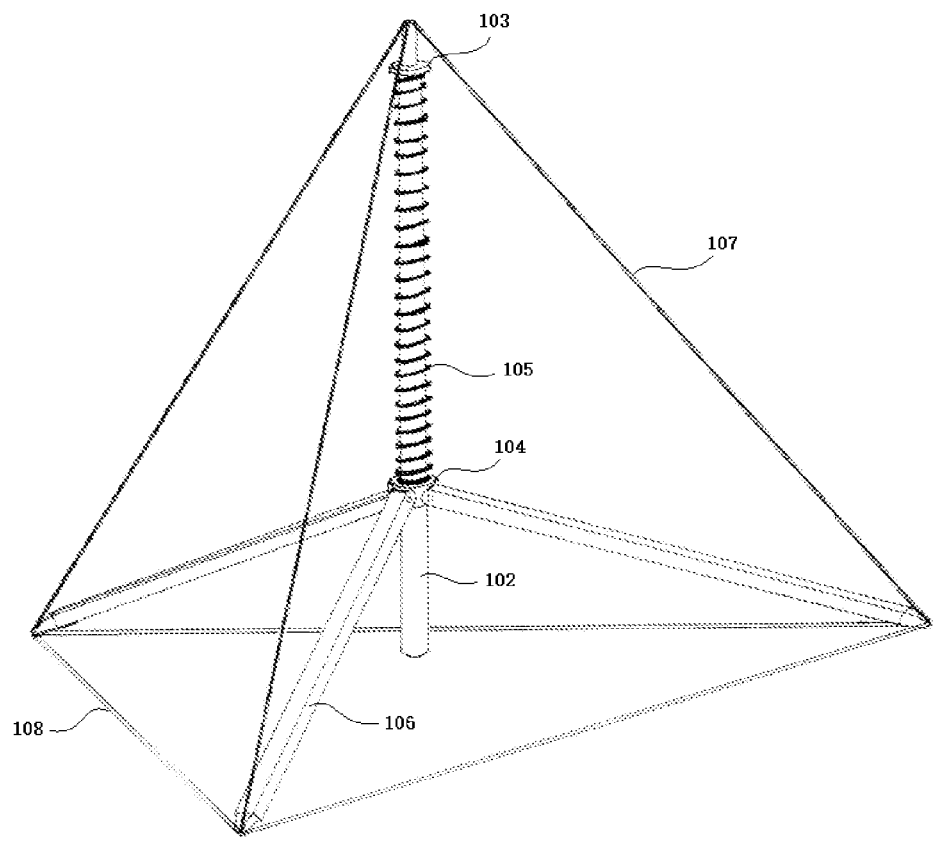
FIG. 2 is a structural view of the warning sign after the flexible cloth is hidden of embodiment 1.

The present invention will now be clearly and completely described in further detail with reference to the accompanying drawings. It is obvious that the described embodiments are a part of the embodiments of the present invention, and not all of the embodiments. Based on the embodiments in the present invention, all other embodiments obtained by person skilled in the art without creative efforts are within the scope of the present invention.

It should be noted that in the description of the present invention, the terms of "center", "up", "down", "left", "right", "vertical", "horizontal", "inside", "outside" and the like are based on the orientation or positional relationship shown in the drawings for convenience of describing the present invention and simplifying description. It is not intended or implied that the device or element must have a particular orientation and be constructed and operated in a particular orientation, and therefore it should not be construed as limiting the present invention. Moreover, the terms "first," "second," and "third" are used for describing purposes only and are not intended or implied relative importance.

In the description of the present invention, It should be noted that the terms "install", and "connect" are to be understood broadly unless otherwise explicitly stated and defined, which may be either a fixed connection or a detachable connection, or integral connection; may be mechanical connection or electrical connection; may be directly connected, or may be indirectly connected through an intermediate medium, and may be internal connection between the two elements. The specific meaning of the above terms in the present invention can be understood by a ordinary person skilled in the art.

Further, the technical features involved in the different embodiments of the present invention described below may be combined with each other as long as they do not constitute a conflict with each other.

Embodiment 1

As shown in FIG. 1 of the drawings, the present invention provides a ejection type safety warning sign for car, having a polyhedral structure 1a for suppressing tumbling in a free state, and capable of being restrained into a tubular storage state 1b by an external force, and automatically releasing as the polyhedral structure 1a when the external force disappears; the polyhedral structure 1a having a warning marker 101 on the surface. As a variant, the polyhedral structure 1a may be a tetrahedron, and further preferably a regular tetrahedron.

As a specific embodiment, the polyhedral structure 1a includes at least: a circular tube 102 having a stop ring 103 which can be located at or near the end of the circular tube 102; a slip ring 104 slidably movable to the circular tube 102; an elastic member 105 elastically connecting the stop ring 103 and the slip ring 104; wherein the elastic member 105 may preferably be a spring; a brace strut 106 having one end connected to the slip ring 104; a rigid rope 107, one end of which is connected to one end of the circular tube 102 near the stop ring 103, and the other end is connected to the brace strut 106; a flexible rope 108 that connects the rigid rope 107; wherein the rigid rope 107 and the flexible rope 108 are also connected with a flexible cloth 109 having the warning marker 101. Taking the polyhedral structure 1a as a tetrahedron as an example, there are three rigid ropes 107 and three flexible ropes 108. Accordingly, the number of the brace struts 106 is also three. The three rigid ropes 107 are distributed in a "claw" type, and each constitutes three faces. Three flexible ropes 108 are sequentially connected to the ends of the rigid ropes 107 and formed a fourth face. When the polyhedral structure 1a is in a free state, an external force is applied to the three brace struts 106 toward the circular tube 102. At this time, the slip ring 104 is pressed against the elastic member 105, and the stop ring 103 abuts against the elastic member 105. The elastic member 105 is continuously compressed until the three rigid ropes 107 are gathered together. The polyhedral structure 1a becomes the tubular storage state 1b at this time, and the flexible ropes 108 are naturally curled. After the external force is removed, the slip ring 104 is slidably moved along the circular tube 102 due to the resilience of the elastic member 105, so that the brace struts 106 drive the rigid ropes 107 to be stretched, and the flexible ropes 108 is tightened. At this time the polyhedral structure 1a is returned to a free state. The rigid ropes 107 cannot be replaced by a flexible material rope because the elastic member 105 has a strong resilience, which requires the rope to have a certain tensile strength. The flexible ropes 108 are also not replaced by rigid material ropes because the remaining ropes should be easily bent for storage when the rigid ropes 107 are gathered together.

As a variant, the rigid rope is preferably a wire rope.

As a variant, the flexible rope is preferably a nylon rope.

Embodiment 2

Figure 3:
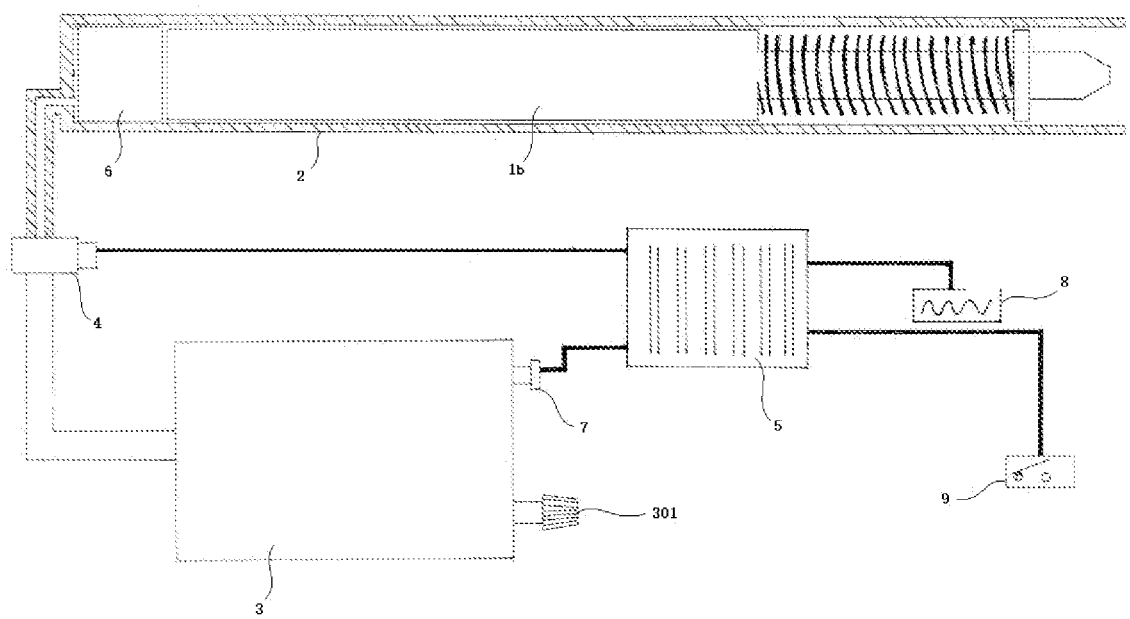
FIG. 3 is a structural view of the ejection system of embodiment 2.

As shown in FIG. 3 of the drawings, the present invention provides a ejection system, comprising:

the warning sign as described in embodiment 1 (when the warning sign is in the ejection system, the warning sign is in a tubular storage state 1b)

a launch tube 2 having an inner cavity for accommodating the warning sign in the tubular storage state. The warning sign in the tubular storage state 1b is disposed in the inner cavity of the launch tube 2. The opening of the launch tube 2 is toward the rear of the vehicle.

a pressure tank 3 communicated with an end of the launch tube for launching the warning sign by air pressure;

a solenoid valve 4 disposed between the launch tube and the pressure tank for realizing opening and closing control between the launch tube 2 and the pressure tank 3;

a controller 5 electrically connected to the solenoid valve 4 for controlling the launching speed of the warning sign by controlling the ventilation time of the solenoid valve 4;

wherein the launch tube 2 is provided with a piston 6 for pushing the warning sign. Gas pushes the piston 6, and the piston 6 pushes the warning sign out of the launch tube 2. The piston 6 is an inexpensive component which can be detached from the launch tube 2 with the gas during the launching process, and the piston 6 can be replenished when the subsequent warning sign is refilled and loaded.

As another embodiment, wherein the ejection system further comprises a pressure sensor 7 disposed in the pressure tank 3 and electrically connected to the controller 5 for monitoring the pressure value in the pressure tank 3 by the controller 5 to determine whether the current air pressure can meet the launch demand. Assuming that current the pressure value in the current pressure tank 3 is lower than the launch threshold, the controller 5 can be controlled to not activate the ejection system, or the driver can be alerted.

As another embodiment, wherein the pressure tank 3 has an air inlet 301 for charging and discharging gas.

As another embodiment, wherein the controller 5 is also electrically connected with a vehicle speed sensor 8. The vehicle speed sensor 8 can be selected from the vehicle's own sensor or externally. It is mainly used to enable the controller 5 to obtain the current vehicle speed through the vehicle speed sensor 8, and control the ventilation time of the solenoid valve 4 according to the current vehicle speed for controlling the final speed of the warning sign when it launches off the launch tube 2. The final speed is preferably zero in the ideal state, that is, the warning sign is allowed to fall freely onto the road surface to prevent rolling and slipping. Of course, the controller 5 can also determine whether the ejection system is activated according to the current vehicle speed. For example, when the vehicle speed is less than or equal to 30 km per hour, the ejection system can be controlled not to be activated. The first is to prevent false triggering and avoid injury to pedestrians behind the vehicle. The second is not necessary to quickly set the safety warning sign when the vehicle speed is too low.

As another embodiment, wherein the controller 5 is also electrically connected with a trigger switch 9. The trigger switch 9 can be provided with a function button of the automobile steering wheel, or can be integrated on the automobile steering wheel, or an external button.

The specific working process of the ejection system is as follows:

Working condition 1: the vehicle speed is 100 km per hour

The driver finds an accident in front and needs emergency braking. At the same time, pressing the trigger button of the ejection system, the controller 5 reads the current vehicle speed through the vehicle speed sensor 8 after receiving the trigger signal, and reads the air pressure value of the pressure tank 3 through the pressure sensor 7. Then the power-on time of the solenoid valve 4 corresponding to the air pressure required to launch the warning sign at a speed equal to the vehicle speed is calculated. And then the solenoid valve 4 is energized according to the power-on time. Then the high pressure gas is introduced into the launch tube 2. The piston 6 pushes the warning sign to eject. The warning sign in the tubular storage state 1b is automatically unfolded into a polyhedral structure after being detached from the launch tube 2, thereby realizing quick placement of the warning sign. After the accident is processed, the warning sign is manually taken back, and the gas in the pressure tank 3 is returned to the garage or 4S shop. And the warning sign and the new piston 6 are stored in the launch tube 2 for the next use.

Working condition 2: the vehicle speed is 30 km per hour

The driver finds an accident in front and needs emergency braking. At the same time, pressing the trigger button of the ejection system, the controller 5 reads the current vehicle speed through the vehicle speed sensor 8, finds that the current speed is lower than the ejection threshold, and the controller 5 controls not to eject the warning sign.

Although the embodiments of the present invention have been disclosed above, they are not limited to the applications previously mentioned in the specification and embodiments, and can be applied in various fields suitable for the present invention. For ordinary skilled person in the field, other various changed model, formula and parameter may be easily achieved without creative work according to instruction of the present invention, changed, modified and replaced embodiments without departing the general concept defined by the claims and their equivalent are still included in the present invention. The present invention is not limited to particular details and illustrations shown and described herein.

What is claimed is:

1. An ejection type safety warning sign for car, having a polyhedral structure for suppressing tumbling in a free state, being capable of being restrained into a tubular storage state by an external force, and being automatically released as the polyhedral structure when the external force disappears; the polyhedral structure having a warning marker on the surface, wherein the polyhedral structure includes at least: a circular tube having a stop ring; a slip ring slidably movable to the circular tube; an elastic member elastically connecting the stop ring and the slip ring; a brace strut connected to the slip ring; a rigid rope, one end of which is connected to one end of the circular tube near the stop ring, and the other end is connected to the brace strut; a flexible rope connected with the rigid rope; wherein the rigid rope and the flexible rope are also connected with a flexible cloth having the warning marker.

2. The warning sign according to claim 1, wherein the polyhedral structure is a tetrahedron.

3. The warning sign according to claim 1, wherein the rigid rope is a wire rope.

4. The warning sign according to claim 1, wherein the flexible rope is a nylon rope.

5. A ejection system, comprising:
the warning sign according to claim 1;
a launch tube having an inner cavity for accommodating the warning sign in the tubular storage state;
a pressure tank communicated with an end of the launch tube;
a solenoid valve disposed between the launch tube and the pressure tank;
a controller electrically connected to the solenoid valve;
wherein the launch tube is provided with a piston for pushing the warning sign.

6. The ejection system according to claim 5, wherein the ejection system further comprises a pressure sensor disposed in the pressure tank and electrically connected to the controller.

7. The ejection system according to claim 5, wherein pressure tank has an air inlet.

8. The ejection system according to claim 5, wherein the controller is also electrically connected with a vehicle speed sensor.

9. The ejection system according to claim 5, wherein the controller is also electrically connected with a trigger switch.

* * * * *